Figure 1:
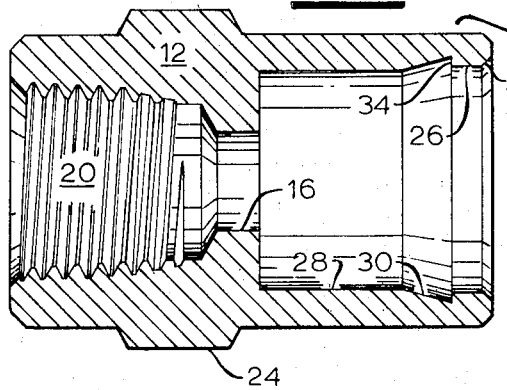

United States Patent [19]  
Timbers

[11] 3,773,360  
[45] Nov. 20, 1973

[54] QUICK DISCONNECT COUPLING  
[76] Inventor: William R. Timbers, 715 Nutmeg Ave., Sunnyvale, Calif. 94087  
[22] Filed: Sept. 1, 1972  
[21] Appl. No.: 285,630

[52] U.S. Cl. .............................. 285/307, 285/321  
[51] Int. Cl. ............................................. F16l 21/08  
[58] Field of Search .................. 285/321, 307, 305, 285/317, 82, 319, 7, 39, 18, 1

[56] References Cited  
UNITED STATES PATENTS

| 3,718,350 | 2/1973 | Klein | 285/39 |
| 3,608,932 | 9/1971 | Brown | 285/18 |
| 3,273,915 | 9/1966 | Bishop et al. | 285/18 |
| 3,439,944 | 4/1969 | Leutenegger | 285/321 |
| 3,447,819 | 6/1969 | Borsum et al. | 285/321 X |
| 3,381,983 | 5/1968 | Hanes | 285/321 |
| 3,193,309 | 7/1965 | Morris | 285/321 |
| 2,436,206 | 2/1948 | Deming | 285/82 |

FOREIGN PATENTS OR APPLICATIONS

| 1,407,875 | 6/1965 | France | 285/321 |

Primary Examiner—Thomas F. Callaghan  
Attorney—Victor R. Beckman

[57] ABSTRACT

A quick connect and disconnect coupling for a pair of interfitting male and female coupling members which includes a resilient locking member carried by the male coupling member and snap locking with the female coupling member upon axial engagement of the coupling members into locked condition. Camming means on the female coupling member are engageable with the locking member when the coupling members are further axially engaged beyond the locked condition to contract the locking member into unlocked condition. Upon still further axial engagement of the coupling members, locking member capture means on the male coupling member engage with the locking member to hold the same in contracted condition whereby the coupling members may be separated. Removable stop means may be included between the coupling members to prevent inadvertent unlocking, which stop means must be removed before disconnection of the coupling is possible.

13 Claims, 6 Drawing Figures

PATENTED NOV 20 1973 3,773,360

QUICK DISCONNECT COUPLING

BACKGROUND OF THE INVENTION

This invention relates to quick connect and disconnect couplings for the quick interconnection and disconnection of interfitting male and female members.

Quick connect and disconnect couplings are well known and have been employed for numerous purposes. For purposes of illustration the coupling members are shown comprising fittings for the connection of conduit such as hose, pipe, tubing, or the like, for use in a fluid pressure or vacuum system. The invention is not so limited, however, and may be used for quickly connecting and disconnecting male and female members, whether of tubular or non-tubular construction.

Of the quick connect/disconnect fitting systems known, many are of relatively complicated design and expensive to produce. Often they are subject to accidental operation of the release mechanisms which results in unintended disconnection of the coupling members. For example, with one type of prior art coupling the members are disconnected by simply sliding a sleeve along the female member. If the coupling is under pressure the members may fly apart with considerable force creating a dangerous situation. Also, such couplings are often balky, taking up much space. Many require relative rotation of the parts for connecting and disconnecting the same which limits their use to installations where ample space to effect such rotary motion is afforded. In addition many prior art quick connect and disconnect couplings provide no visual indication of the coupling condition.

An object of this invention is the provision of a quick connect and disconnect coupling which overcomes the above-mentioned shortcomings and difficulties of the prior art and has many advantages thereover.

An object of this invention is the provision of a quick connect and disconnect fitting of such simple and inexpensive design and construction so as to provide an operational and economically feasible substitute for conventional fittings which require much more installation time.

An object of this invention is the provision of an improved quick connect and disconnect coupling in which only relative axial movement of the two coupling members is required for both connect and disconnect operations.

An object of this invention is the provision of a quick connect and disconnect coupling which includes a visible removable stop member which prevents inadvertent disconnection during the connection operation and use of the coupling, and which must be removed before disconnection of the coupled members is possible.

The above and other objects and advantages of the invention are achieved by means of interfitting male and female coupling members, and a resilient expandable and contractible locking member carried in an annular groove formed in the male coupling member. The bore of the female coupling member is formed with a rearward portion adjacent the open end, a smaller diameter forward portion, and an intermediate or locking recess into which the locking member snaps upon axial insertion of the male coupling member into the female coupling member into locking condition. The locking member is contracted by camming action with the rearward bore portion of the female coupling member during initial insertion of the male member therein to condition the same for radial expansion upon reaching the locking recess. For sealing engagement, a seal member may be provided between the coupling members. The coupling members are disconnected by further relative axial movement of the male coupling member into the female coupling member whereby the locking member is again contracted to unlocked condition, this time by camming action with the locking recess. Locking member capture means for holding the locking member in the contracted unlocked position are operative upon still further axial engagement of the coupling members to free the coupling members for axial separation. After separation the coupling is conditioned for reengagement by axially moving the locking member along the male coupling member to release the same from the captured contracted condition. To prevent inadvertent disconnection a removable stop member may be included to limit axial engagement of the coupling members to prevent capture of the locking member by said capture means, which stop member therefore must be removed to permit capture of the locking member and subsequent separation of the coupling members.

Figure 4:
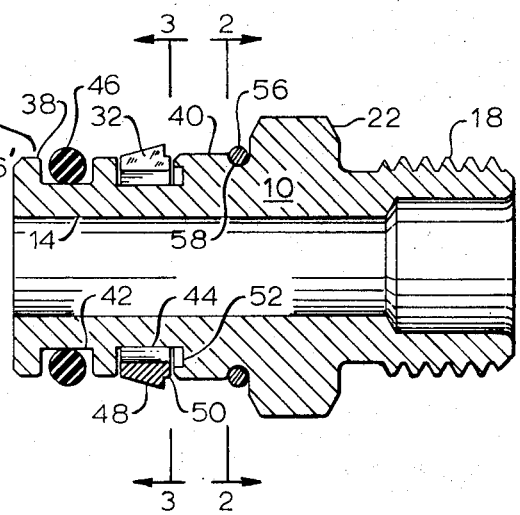
Figure 4:
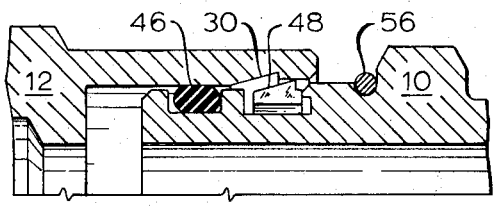
Figure 3:
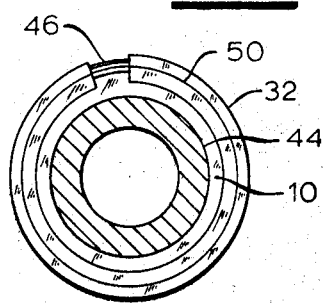
Figure 5:
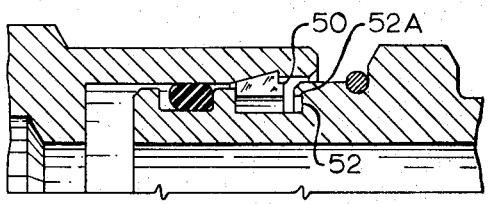
Figure 6:
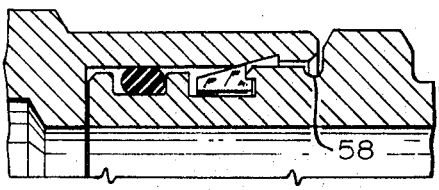
Figure 2:
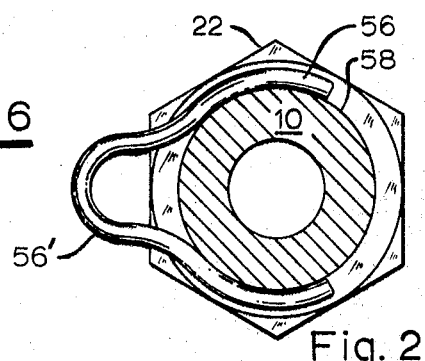

The invention and other objects and advantages thereof will be better understood from the following description taken in connection with the accompanying drawings. In the drawings wherein like reference characters refer to the same parts in the several views:

FIG. 1 is a longitudinal sectional view of a coupling which embodies this invention and showing the coupling members in disengaged or disconnected condition;

FIGS. 2 and 3 are cross-sectional views of the male coupling member taken along line 2—2 and 3—3, respectively, of FIG. 1; and FIGS. 4, 5 and 6 are fragmentary longitudinal sectional views showing the coupling during connection operation, in locked position, and during disconnection operation, respectively.

Reference first is made to FIG. 1 wherein interengageable male and female coupling members 10 and 12, respectively, are shown which embody the coupling means of this invention. For fluid, or vacuum, coupling purposes the members 10 and 12 are formed with bores 14 and 16 therethrough. For illustration only the coupling members are shown formed with external and internal threaded portions 18 and 20 at the opposite rearward and forward ends thereof respectively, for use in connection of the coupling members to conduits such as pipes, hose, or tubing, or to other members to be interconnected. Hexagonal wrench accommodating flanges 22 and 24 may be provided on the coupling members to facilitate attachment thereof to the members to be connected. It will be apparent that means other than the illustrated threaded means may be used for attachment of the coupling members to the members to be releaseably connected, including means integrally forming the coupling members to the members to be connected.

The bore 16 in the female coupling member 12 includes a rearward or outer portion 26, a forward or inner portion 28 of smaller diameter than the outer portion 26, and a tapered locking recess or groove 30 intermediate the bores 26 and 28 to receive a locking member 32 carried by the male coupling member 10. A shoulder 34 is formed between the outer diameter portion 26 and intermediate tapered bore portion 30 for locking engagement with the rear wall of the locking member 32 in the coupling locked position described below. The forward, small diameter, end of the tapered bore portion 30 terminates in the smaller diameter bore portion 28 with no shoulder being formed therebetween. The outer rear end of the bore 26 may be chamfered as at 26' to facilitate entry of the male coupling member and camming of the locking member 32 during coupling operation.

The quick-connect coupling portion of the male member 10 is shown comprising a cylindrical forward end 38 and a larger diameter intermediate body portion 40. The diameters of the forward end portion 38 and larger diameter intermediate portion 40 are slightly less than the small diameter bore portion 28 and larger diameter bore portion 26, respectively, of the female coupling member to permit interengagement of the coupling members.

Annular grooves 42 and 44 are formed in the forward end 38 of the male member, in which grooves a seal member 46 and the lock member 32, respectively, are carried. The seal member 46, which may comprise an O-ring, or the like, is seated in the groove 42 and is adapted for sealing engagement with the small diameter bore portion 28 of the female coupling member in the engaged coupling condition for fluid tight engagement between the coupling members. Obviously, seal members other than O-rings may be used. For example, if the male member is made of suitable material, such as plastic, the seal member may be integrally formed adjacent the forward end of such male member.

The locking member 32 is shown comprising a radially expandable and contractible split ring of resilient material such as metal, or the like. In the decoupled condition shown in FIGS. 1, 2 and 3 the locking ring 32 is in a normal radially expanded condition. In such expanded condition the inner diameter of the locking member is sufficiently larger than the diameter of the groove 44 in which the ring is carried to allow for adequate contraction of the ring to permit passage thereof through the bore 26 during connect and disconnect operations. Prior to coupling, the locking member 32 is loosely contained within the groove 44 and normally would rest therewithin. However, for purposes of illustration only, the locking ring is shown centered along the male coupling member axis in FIGS. 1 and 3.

The outer wall 48 of the locking ring tapers radially inwardly in the forward direction for camming action with the female coupling member during the connect and disconnect operations to contract the locking ring during such operations. The rear wall of the locking ring is provided with a rearwardly extending annular flange 50 adjacent the ring bore. A cooperating recess 52 is formed in the forward facing wall of the groove 44 into which the flange 50 enters during the disconnect operation as described below. For present purposes it will be understood that the cooperating flange and recess comprise locking ring capture means for holding the locking ring in a contracted condition during disconnection operation.

Connection of the coupling members simply is effected by axially inserting the male coupling member into the female coupling member. During the coupling operation the locking ring 32 is forced into and thence through the bore portion 26 of the female coupling member. During initial axial coupling movement the ring is contracted by camming action of the chamfered outer bore end 26' on the tapered locking ring wall 48. When contracted to the size of the bore portion 26 (as illustrated in FIG. 4) the locking ring 32 is axially urged therethrough as the coupling members are thrust together and, upon reaching the locking groove 30, snaps radially outwardly into locking position therewithin. In the locked condition, illustrated in FIG. 5, the O-ring seal member 46 provides a fluid seal connection between the bore portion 28 of the female coupling member and the male coupling member. With the illustrated design, the female member provides an ideal "lead" for the seal member making it substantially impossible to cut, scrape or otherwise damage the seal member during the coupling operation.

In the illustrated coupling condition (FIG. 5) axial separation of the coupling member is prevented by engagement of the rear wall of the locking ring with the shoulder 34 on the female coupling member, and engagement of the forward wall of the locking ring with the rearward facing wall of the groove 44 in the male coupling member. Fluid pressure within the coupling which tends to axially separate the coupling members results in shear stress along the locking ring and on the cooperating parts of the coupling members. No amount of axial separation force, within the limits of strength of the several coupling elements, will separate the coupling members.

Decoupling is effected simply by first moving the coupling members together axially from the coupled condition (to contract and then to capture the locking ring in the contracted condition as described below) and then axially separating them. No twisting or turning of the coupling members, or of locking sleeves, or the like, is required. However, to prevent inadvertent or accidental decoupling, a removable stop member 56 may be provided to limit axial insertion of the male coupling member into the female member. Such stop member 56 may comprise a resilient split ring adapted for engagement in a groove 58 in the male member adjacent the flange 22. As seen in FIG. 2, the stop member may be formed with an outwardly protruding or bulging section 56' opposite the split or opening thereon to facilitate removal of the ring as by use of a tool such as a screw driver or the like. With the stop member in position, relative axial travel of the coupling members into further engagement is limited by abutment of the rear of the end face of the female coupling member with said stop member, which travel is insufficient to unlock the members as will become apparent from the following description of the unlocking operation.

With the stop ring 56 removed, disconnection is effected by axially moving the coupling members together into further engagement. The locking ring 32, which is moved along with the male coupling member during initial decoupling operation is thereby again contracted, this time by the camming action of the tapered bore 30 on the cooperating tapered locking ring wall 48. Such contraction continues until the locking ring outer diameter is slightly smaller than the diameter of the bore portion 26 in the female member. At this point in the axial movement the outside diameter of the flange 50 on the locking ring is contracted to substantially the diameter of the radially outer wall 52A of the recess 52. Therefore, upon further axial movement of the coupling members together, the male coupling member moves axially relative to both the female coupling member and the contracted locking ring, and into the position illustrated in FIG. 6 wherein the flange 50 on the locking ring 32 enters the recess 52. The coupling now is in condition for axial separation of the coupling members. It will be seen that portions of the tapered outer wall 48 of the locking ring and tapered camming surface 30 remain in engagement in such fully engaged condition. Consequently, during initial axial withdrawal of the male coupling member from the female coupling member, the resilient locking member tends to return to normal expanded condition, and in so doing the flange 50 thereon is tightly captured in tight frictional engagement within the recess 52.

In this captured condition the locking ring diameter is smaller than that of the bore 26 to permit complete withdrawal of the male coupling member 10 from the female coupling member 12. The disconnected coupling is prepared for recoupling by axially sliding the locking member forward along the male coupling member to release the same from the recess 52 thereby allowing the locking member to expand to its normal condition. Such movement is easily effected manually by means of one's fingernails or by use of some tool such as a screwdriver, knife, or the like. It will be noted that by placing the stop member 56 on the male coupling member prior to the coupling or recoupling operation inadvertent capture of the locking ring is prevented during the coupling operation, and subsequently thereof. Therefore, when coupling has been effected with the stop member in position, the presence of the stop member thereafter provides a visual indication that the coupling has not been inadvertently or accidently released.

The invention having been described in detail in accordance with the requirements of the Patent Statutes, various changes and modifications may suggest themselves to those skilled in this art. For example, it will be apparent that the coupling may be used without the stop member if desired. Also, different types of stop members such as removable pins, sleeves, and the like, may be used in place of the illustrated split ring. Also, as mentioned above other sealing members may be used in place of the illustrated O-ring seal. In addition, operation in a vacuum system instead of a pressure system is contemplated, as well as use in a simple connecting device of a pair of telescopic members. Also, suitable valves may be employed in the construction of the coupling members which automatically close upon decoupling. In addition, it will be apparent that the locking member 32 and/or seal ring 46 and associated grooves may be located on and formed in the opposite coupling members from that which is illustrated. It is intended that the above and other such changes and modifications shall fall within the spirit and scope of the invention as defined in the appended claims.

I claim:

1. A releasable coupling comprising,
   engageable male and female coupling members,
   an expandable and contractible locking member carried by the male coupling member in both assembled and disassembled positions,
   means on the female coupling member for receiving in locking engagement the locking member to lock the coupling members together,
   means integral with the female coupling member and means integral with said male coupling member for removing the locking member from locking engagement with the female coupling member upon axial movement of the coupling members together beyond the locked position thereof to place the coupling members in unlocked condition whereby the locking member is carried axially by the male member,
   means integral with the male coupling member for capturing the locking member in said unlocked condition upon further axial movement of the coupling members together to release the coupling members for axial separation.

2. The releasable coupling as defined in claim 1 wherein said locking member comprises a resilient contractible split annular member, and said capturing means comprises cooperating flange and recess means formed on the locking member and male coupling member which are engageable in the unlocked condition of the coupling.

3. The releaseable coupling as defined in claim 1 including a removable stop member on the coupling to limit axial engagement of the coupling members for permitting axial engagement of the coupling members to locking condition while preventing further axial engagement thereof together to prevent locking member capture.

4. The releasable coupling defined in claim 1 wherein said locking member is in an axially movable position with said male coupling member in the unlocked condition of the engaged coupling members 5. A releaseable coupling comprising,
   a female coupling member having a bore therein which includes a rearward outer portion and adjacent locking groove inwardly thereof,
   a male coupling member formed with an annular groove insertable into the bore of the female coupling member,
   a radially contractible locking ring carried in the annular groove in the male coupling member in both the assembled and disassembled positions, said locking ring being contracted by camming action with the rearward portion of the bore in the female coupling member upon insertion of the male coupling member therein and radially expandable into the locking groove into locking position, said locking ring being contractible by camming action with the female coupling member to an unlocked position upon further axial movement of the male coupling member and locking ring into the bore of the female coupling member, and
   means integral with the male coupling member for capturing the locking ring in the unlocked position within the annular groove in the male coupling member upon still further axial movement of the male coupling member into the bore of the female coupling member to permit axial separation of the coupling members.

6. The releasable coupling as defined in claim 5 wherein said male coupling member is formed with a second annular groove, and said female coupling member bore is formed with an inner forward portion of smaller diameter than the outer bore portion, and
   a seal ring carried in the second annular groove for sealing engagement with the inner bore portion of the female coupling member in the coupled condition.

7. The releasable coupling as defined in claim 5 wherein said locking ring comprises a split ring formed with a radially inwardly and forwardly tapered outer wall for camming engagement with the rearward bore portion and locking groove of the bore in the female coupling member, said locking groove having a complementary tapered wall and a locking shoulder between said tapered wall and outer bore portion for locking engagement with the split ring.

8. The releasable coupling as defined in claim 5 wherein said capturing means includes complementary frictional engaging means on the locking ring and male coupling member which are tightly frictionally engageable in the captured condition of the locking ring.

9. The releasable coupling as defined in claim 8 wherein said capturing means includes a rearwardly extending flange formed on the locking ring and a complementary forwardly facing recess formed in the rear wall of the annular groove in the male member to receive the flange in tight frictional engagement in the captured unlocked condition of the locking ring.

10. The releaseable coupling as defined in claim 5 including a removable stop member on the coupling for limiting axial engagement of the coupling members to prevent capture of the locking ring while permitting locking engagement of the coupling members.

11. The releasable coupling as defined in claim 10 wherein the removable stop member comprises a split ring removably attached to the male member and engageable by the female member for limiting axial engagement.

12. A releaseable coupling comprising,
a female coupling member having an inner circumferential groove,
a male coupling member receivable in the female coupling member and having an outer circumferential groove,
an expandable and contractible locking member carried in both assembled and diasssembled positions in one of said grooves and movable laterally into locking engagement in the other of said grooves upon axial movement of the coupling members together into locked position,
means integral with one of said members for removing the locking member from locking engagement upon further axial movement of the coupling members together beyond said locked position thereof to place the coupling members in unlocked condition whereby the locking member is carried axially by one of said member,
means integral with the one coupling member which carries the locking member for capturing the locking member in said unlocked condition upon still further axial movement of the coupling members together to release the coupling members for axial separation.

13. The releaseable coupling as defined in claim 12 wherein said locking member comprises a resilient split annular member, and said capturing means comprises cooperating flange and recess means formed on the locking member and the one coupling member which carries said locking member which flange and recess means are engageable in the unlocked condition of the coupling by relative axial movement of the locking member and the one coupling member which carries the same.

* * * * *